Patented Oct. 29, 1940

2,219,565

UNITED STATES PATENT OFFICE 2,219,565

COMPOSITION FOR COLORING FLAMES

Arthur C. Riemer, Delmar, N. Y.

No Drawing. Application September 9, 1939,
Serial No. 294,201

3 Claims. (Cl. 52—23)

My invention relates to a composition of matter in powdered or granular form for producing colored flames when sprinkled on wood fuel burning in the open, as for example, in a fire place or a camp fire.

It is well known that many salts such as those of sodium, potassium, calcium, lithium, barium, strontium and copper when burned will produce flames of various colors and it has heretofore been proposed to impregnate various fuels with salts of this character or to form briquettes or other articles of various combustible substances containing such salts and which, when burned, will produce colored flames.

Salts adapted to produce colored flames may be thrown or sprinkled on wood burning in an open fire but a large percentage of the salts is wasted when used in this way. The salts do not cling to the wood, are easily jarred off, and fall through the spaces between the burning wood into the ashes at the bottom of the fire where there usually is not sufficient heat to effect a combustion thereof, and, in any event, the color effect is lost or obscured.

The principal object of my invention is to provide a composition of matter in powdered or granular form so that it can be conveniently sprinkled on the burning wood and in which the flame-coloring salt is combined with a substance adapted to cause the salt to adhere tenaciously to the burning wood. The substance employed for intermixture with the salt should be one which will adhere both to the wood and also to the particles of salt and thus bind them to the wood.

In addition, the intermixed substance should be nonhygroscopic and substantially incombustible. If the substance is hygroscopic I find that the moisture absorbed thereby from the atmosphere will dissolve the salt and thus form a corrosive solution and, in any event, moisture in the mixture interferes with proper combustion of the salt.

The substance should be incombustible or substantially so in order to prolong the color effect produced by the burning of the salt and also to prevent the generation of undesirable and unpleasant smelling gases.

As a suitable substance for intermixture with the salt I use dry pulverized ashes preferably resulting from the combustion of anthracite coal. The ashes cling closely to the particles of salt and also to the wood and thus prevent the particles of salt from falling through the fire into the ash-bed. Moreover, the ashes, due to their heat insulating properties, very greatly prolong the duration of the flames.

Of the various salts that may be employed, I prefer to use cupric chloride not only because of the attractive flame color produced but because of its long duration.

Furthermore, I prefer to use the cupric chloride in the dehydrated form. In this form the chloride is a fine powder which produces better results than the crystal form, is less liable to absorb mixture, and is less expensive. Preferably, the salt, and the ashes in pulverized form, are intermixed in equal proportions by volume, but the relative quantities may be varied from about 25% by volume up to about 60% by volume of salt with from 75% to 40% by volume of the ashes.

What I claim is:

1. A composition adapted to produce colored flames when applied to wood fuel burning in an open fire and comprising, by volume, from 25% to 60% of dehydrated cupric chloride, and from 75% to 40% of pulverized ashes of anthracite coal.

2. A composition adapted to produce colored flames when applied to wood fuel burning in an open fire and comprising about equal parts, by volume, of dehydrated cupric chloride and pulverized ashes of anthracite coal.

3. A composition adapted to produce colored flames when applied to wood fuel burning in an open fire and comprising, by volume, from 25% to 60% of a pulverized salt selected from the group consisting of the salts of sodium, potassium, calcium, lithium, barium, strontium and copper and of 75% to 40% of pulverized ashes of anthracite coal.

ARTHUR C. RIEMER.